UNITED STATES PATENT OFFICE.

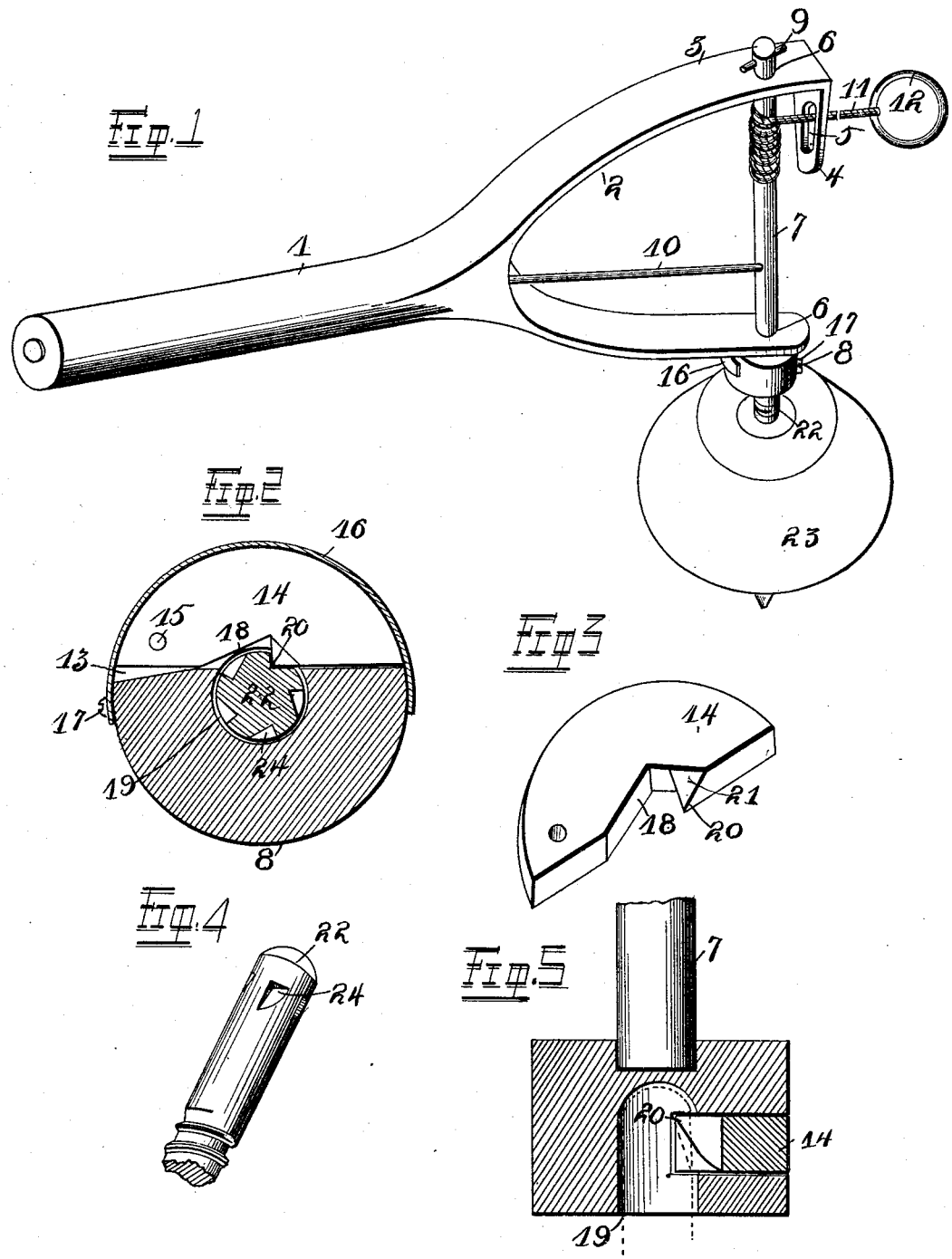

FRANCIS M. IDLE, OF ST. LOUIS, MISSOURI.

SPINNING-TOP.

SPECIFICATION forming part of Letters Patent No. 480,817, dated August 16, 1892.

Application filed February 27, 1892. Serial No. 423,095. (No model.)

*To all whom it may concern:*

Be it known that I, FRANCIS M. IDLE, of the city of St. Louis and State of Missouri, have invented certain new and useful Improvements in Tops, of which the following is a full, clear, and exact description, reference being had to the accompanying drawings, forming a part hereof.

My invention relates to improvements in tops; and it consists in the novel arrangement and combination of parts, as will be more fully hereinafter described, and designated in the claims.

In the drawings, Figure 1 is a perspective view of my complete invention, showing a top attached to the same in a position for spinning. Fig. 2 is a horizontal cross-section taken through the socket of the device, showing the shaft or extension carried by the top located therein, and also in cross-section. Fig. 3 is a perspective view of the dog which I employ in connection with the socket. Fig. 4 is a perspective view of the shaft which is carried by the top, and Fig. 5 is a vertical longitudinal section of the socket.

The object of my invention is to dispense with the ordinary labor employed in spinning a top and in place thereof employ a simple and effective device which will accomplish not only the same but better results.

Referring to the drawings, 1 represents the handle of the device, and 2 the forked portion of the same, to which the various movable parts are easily united. The upper arm 3 of the forked portion 2 is provided with a depending extension 4, and formed in said extension is an elongated opening 5, through which the operating-cord of the device is adapted to pass.

6 represents two circular openings which are formed in the forked extension 2 of the handle, within which a vertical operating-shaft 7 is adapted to turn and be turned in a manner as hereinafter described. To the lower end of the shaft 7 is secured a socket 8, and passed through the upper end of the said shaft is a pin 9, by which means the said shaft is held in position and united to the device.

10 represents an elastic cord or other equivalent material, one end of which is attached to the shaft 7 and the opposite end attached to the handle 1, by which construction the shaft 7 when rotated in one direction will wind up the elastic cord 10 upon the said shaft. To the shaft 7 is also attached one end of an operating-cord 11, which when in its normal position is wound upon the shaft 7, as shown in Fig. 1 of the drawings, by means of the elastic cord 10. The said cord 11 passes through the elongated opening 5, formed in the extension 4, and to the opposite end of said cord is attached a ring 12, through which one finger of the hand is inserted for operating the cord 11 in rotating the shaft 7 in one direction. The socket 8 which I employ is especially constructed for the purpose and in such a manner as to release the top when motion is imparted to the same.

13 represents an opening which is formed in the said socket, within which is placed a movable dog 14, and said dog is united or attached to the said socket by means of a pin 15.

16 represents a flat spring, one end of which is secured to the socket by means of a suitable screw 17, and said spring conforms to the shape of the said socket and is adapted to press against the outer surface of the dog 14 and normally hold the same in the position as shown in Fig. 2. The said dog 14 is cut away at its median portion, as shown at 18, adjacent to the opening 19, formed in the socket, and said cut-away portion provided with a point-shaped extension 20, having a beveled face 21, which face is adapted to be struck by the short shaft 22, carried by the top.

23 represents a top, which is somewhat of the ordinary construction and having secured thereto at its top the shaft 22, as above referred to. Near the upper end of the said shaft is formed therein a number of peripheral angular-shaped depressions 24, which are adapted to receive the projection 20, formed on the dog 14 when the same is inserted in the socket 8, and thereby prevent the top 23 from falling out of the socket before the same is rotated. When the shaft 22 is inserted in the socket, the upper end of the same will strike the beveled face 21, formed on the pointed projection 20 of the dog, causing the same to move outward, and when the said shaft is further inserted the said pointed projection 20 will engage with one of the angular-shaped depressions 24 and hold the same.

When it is desired to spin the top 23, the same is inserted into the socket, as shown in Fig. 1, and by pulling the operating-cord 11 quickly the shaft 7 will be correspondingly rotated, imparting motion to the top 23 sufficient to spin the same. By releasing the hold upon the cord 11 the elastic cord will cause the same to again assume its normal position, as shown in Fig. 1, premising, however, that the elastic cord has previously been wound upon the shaft in spinning the top.

It will be readily understood that when motion is imparted to the top 23 the same will be released from its locked position in the socket 8, and therefore will drop out of the same, owing to the construction of the socket, as previously described.

Having fully described my invention, what I claim is—

1. In a device for spinning tops, the combination, with a revoluble operating-shaft, of a block carried thereon having a socket to receive the shaft of the top, a spring-actuated dog adapted to hold the top-shaft in the block and release the same when the shaft is revolved, substantially as shown and described.

2. In a device for spinning tops, the combination, with a revoluble operating-shaft and cord attached, of a block fixed upon said shaft and having a socket, a dog pivoted to the block and forming a side of the socket, said dog having a shoulder, the top-shaft having depressions therein, and the spring for holding the dog in contact with the top-shaft, substantially as shown and described.

3. In a device for spinning tops, the combination, with a handle having a forked end, of the revoluble operating-shaft, the cord attached thereto, the elastic cord connecting the shaft and handle, the socket-block having a yielding retaining-arm which forms a part of the socket, and the top having a shaft adapted to enter the socket of said block and be released therefrom by the retaining-arm being thrown outward, substantially as shown and described.

4. The combination, with a revoluble shaft and cord for operating the same, of a block having a socket, a supplemental block pivoted within the socket-block and providing a side to the socket, and a spring-band for holding the said supplemental block in its normal position, substantially as and for the purpose described.

In testimony whereof I affix my signature in presence of two witnesses.

FRANCIS M. IDLE.

Witnesses:
C. F. KELLER,
ALFRED A. EICKS.